(12) United States Patent
Berlin

(10) Patent No.: US 8,117,373 B2
(45) Date of Patent: Feb. 14, 2012

(54) VM HOST RESPONDING TO INITIATION OF A PAGE SWAP BY TRANSFERRING PAGES FROM HOST-BUT-NON-GUEST-ADDRESSABLE RAM TO HOST-AND-GUEST-ADDRESSABLE RAM

(76) Inventor: Kimon Berlin, Ft Collins, CO (US)

( * ) Notice: Subject to any disclaimer, the term of this patent is extended or adjusted under 35 U.S.C. 154(b) by 446 days.

(21) Appl. No.: 12/432,770

(22) Filed: Apr. 30, 2009

(65) Prior Publication Data

US 2010/0281477 A1    Nov. 4, 2010

(51) Int. Cl.
G06F 12/00    (2006.01)

(52) U.S. Cl. .............................. 711/6; 711/159; 711/165

(58) Field of Classification Search .............. 711/6, 159, 711/165
See application file for complete search history.

(56) References Cited

U.S. PATENT DOCUMENTS

| 5,187,802 A | 2/1993 | Inoue et al. |
| 5,301,287 A | 4/1994 | Herrell et al. |
| 5,490,260 A * | 2/1996 | Miller et al. ............. 711/100 |
| 6,895,491 B2 | 5/2005 | Kjos et al. |
| 7,107,537 B2 | 9/2006 | Abu-Husein |
| 2004/0073783 A1 | 4/2004 | Ritchie |

* cited by examiner

Primary Examiner — Son Dinh
Assistant Examiner — Nam Nguyen

(57) ABSTRACT

A virtual-machine host responds to a guest operating system's initiation of a page swap by transferring a page from host-but-non-guest-addressable RAM to host-and-guest addressable RAM.

18 Claims, 3 Drawing Sheets

VM HOST RESPONDING TO INITIATION OF A PAGE SWAP BY TRANSFERRING PAGES FROM HOST-BUT-NON-GUEST-ADDRESSABLE RAM TO HOST-AND-GUEST-ADDRESSABLE RAM

BACKGROUND

Herein, related art is described to facilitate understanding of the invention. Related art labeled "prior art", if any, is admitted prior art; related art not labeled "prior art" is not admitted prior art.

Databases and many other applications can require access to large quantities of data. Better performance can be achieved by keeping more of the data in relatively fast memory (which is typically solid-state dynamic random-access memory or "RAM") rather than on relative slow but more capacious hard disks. When the amount of data needed for fast access exceeds the amount of available main memory, paging can be used to swap memory between main memory and disk storage. However, paged memory schemes suffer a performance hit with each page swap. To minimize or avoid such page swapping, processors with increased addressing capabilities (e.g., 64-bit addressing as opposed to 32-bit addressing) have been developed along with operating systems that can handle more system memory, which reduces both the amount of paging from disk and the associated performance penalties.

DETAILED DESCRIPTION

Users are not always ready to replace all their hardware and software at once. In order to gain acceptance in the marketplace, hardware is often made "backward" compatible with legacy software. As a result, it is not uncommon, for example, for 32-bit operating systems and applications designed for them to be running on 64-bit hardware. If the 64-bit hardware is populated with more memory than the 32-bit operating system can address as system memory, the 32-bit operating system may suffer performance penalties relative to a 64-bit operating system due to more frequent paging from disk.

The present invention takes advantage of virtual-machine technology to provide for very fast paging from "host-addressable" RAM that is not "guest-addressable". For example, if an application is to run on a 32-bit operating system, that operating system can be run as a guest operating system (OS) on a 64-bit virtual-machine host (hypervisor or combination of hypervisor and host operating system(s)). If the 64-bit system is populated with more RAM than the 32-bit guest OS can address (but that the 64-bit host OS can address), the RAM that the guest OS cannot address can be configured by the host OS so that it functions as a RAM disk for the host OS that functions as a very fast normal disk drive for the guest OS. The RAM disk is then configured to hold the page file (where the paged data is saved) of the guest operating system. Thus, instead of swapping pages from an actual disk, pages are swapped from the host RAM disk for greatly enhanced performance. Further performance gains can be achieved by changing page table descriptors to effect page swaps instead of moving actual memory pages.

Herein, the "host" 1) provides for the virtual machines in which a guest OS can run, and 2) serves as an interface between the virtual machines and the underlying hardware. Conventionally, the entity that provides for the virtual machine is referred to as a "virtual-machine monitor" or a "hypervisor". If the hypervisor also controls the underlying hardware, then the host and the hypervisor are one and the same. If the hypervisor relies on one or more other operating systems, e.g., a domain zero operating system, to control some or all of the hardware, then the "host" is the combination of the hypervisor and the operating system or systems used to control the hardware.

Figure 1:
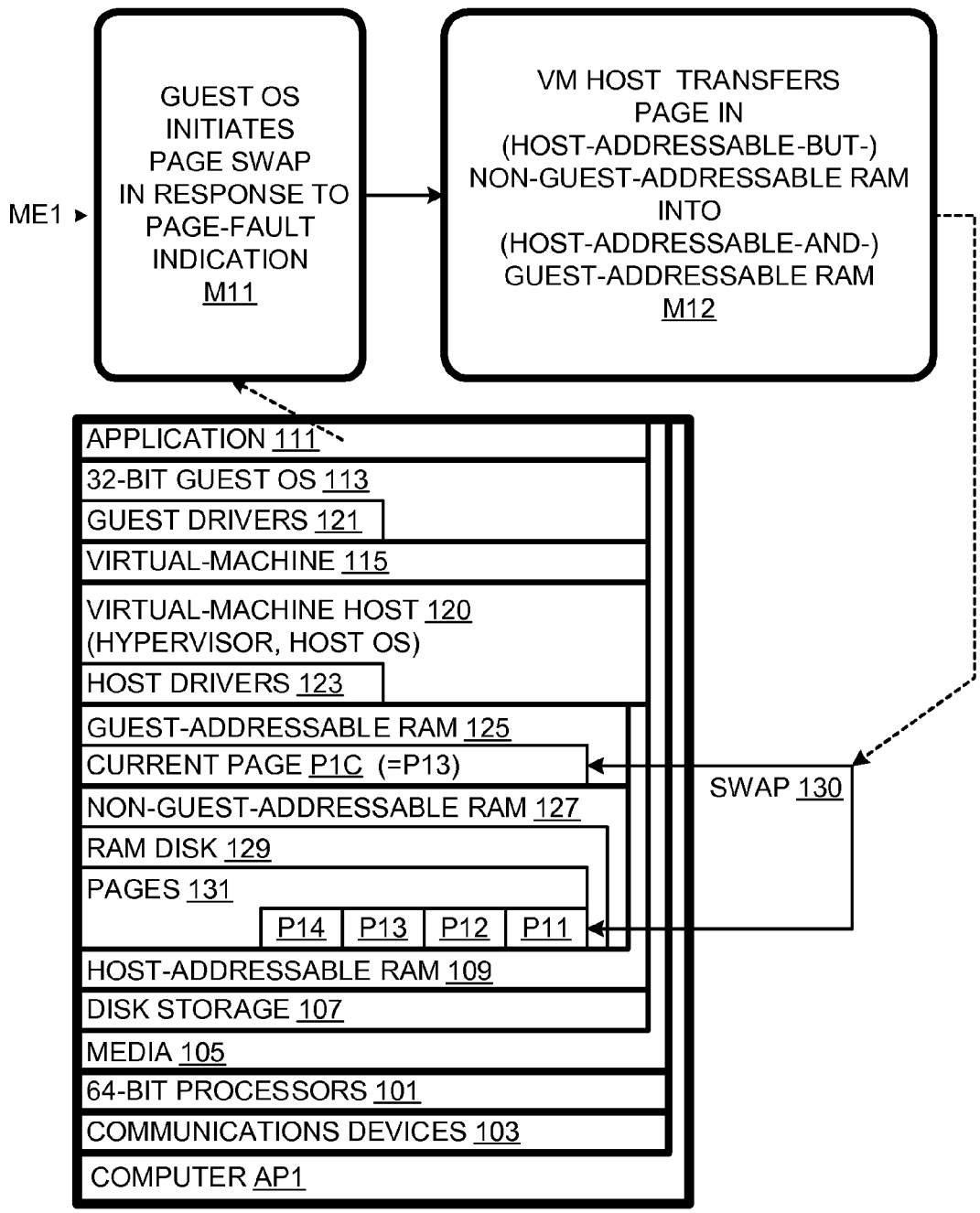
FIG. 1 is a combined flow chart and schematic illustration of a first embodiment of the invention.

A computer system AP1 employing an embodiment of the invention is shown in FIG. 1 including 64-bit processors 101, communications devices 103, and computer-readable storage media 105. Media 105 includes disk storage 107 and random-access memory (RAM) 109, which is dynamic random-access memory (DRAM). Media 105 is encoded with code including computer-manipulable data and computer-executable instructions.

The data is arranged in pages P11-P14 and a current page P1C. The instructions are arranged into programs, including an application 111, a 32-bit guest operating system 113, a virtual machine 115, and a virtual-machine host 120. Host 120 can be a "bare-metal" type I hypervisor. In alternative embodiments, the host is a combination of a hypervisor and one or more other host operating systems that provide interfacing with underlying hardware. Guest operating system 113 includes guest drivers 121 and host 119 includes host drivers 123. Guest drivers 121 are generic drivers, while host drivers 123 are specific to the hardware at hand.

Host 120 is designed for a 64-bit architecture and thus can address a much larger memory space than 32-bit guest operating system 113. The address spaces of processors 101 and host 120 are sufficient to address RAM 109, but not all of RAM 109 can be addressed at any one time by guest OS 113. In various embodiments, the RAM capacity can be marginally to orders of magnitude greater than the address space for guest OS 113. In practice, the RAM disk can provide substantial performance gains when the host-addressable RAM is at least twice the size of the address space of the guest OS.

Since it exceeds the guest-OS address space, host-addressable RAM 109 can be allocated between host-and-guest-addressable RAM 125 and host-but-non-guest-addressable RAM 127. At least a portion of host-but-non-guest-addressable RAM 127 is configured for use as a RAM disk 129 for host 120. RAM disk 129 appears to guest OS 113 as (very fast) disk storage.

At the time represented in FIG. 1, a modified or unmodified copy of page P13 is the current page P1C. As long as application 111 and guest OS 113 only attempt to access memory locations within host-and-guest-address memory, e.g., current page P1C, no page fault is issued. However, when application 111 and/or operating system 113 attempts to access a memory location outside of host-and-guest-address memory 125, guest operating system 113 receives a page fault indication.

Guest operating system 113 responds to this page fault by initiating a page swap 130. This page swap is handled by host 120 by transferring data from host-but-not-guest-addressable RAM 127 to host-and-guest addressable RAM 125. For example, if the requested memory location is in page P11, then host 120 can swap pages P13 and P11 so that page P11 becomes current page P1C in guest-addressable RAM and page P13 is written to non-guest-addressable RAM 127 (e.g., overwriting an older version of page P13 in RAM 127). Since this transfer involves RAM-to-RAM transfers, it is orders of magnitude faster than a transfer from disk.

Computer AP1 provides for a method ME in accordance with an embodiment of the invention and flow-charted in FIG. 1. At method segment M11, guest OS 113 responds to a page fault by initiating a page-swap operation. The page fault can be in response to a request by application 111 to access (load from or store to) a memory location not in the current page P1C or other page in guest-addressable RAM 125.

In response, at method segment M12, host 120 transfers a page including the requested memory location to guest-addressable RAM 125. For example, the current page P1C can be swapped for page P11 in non-guest-addressable memory 127. As a result of this swap 130, for example, page P13, which was the current page when the page fault was signaled at method segment M11, is transferred to non-OS-addressable RAM 127, and the page with the memory location to be accessed, for example, page P11, is transferred to guest-addressable RAM 125. In this case, page P11 becomes current memory P1C upon completion of method segment M12. As noted above, swap 130 is much faster than it would be if it were between main memory and disk storage (or even flash-based solid-state disk) storage.

Figure 2:
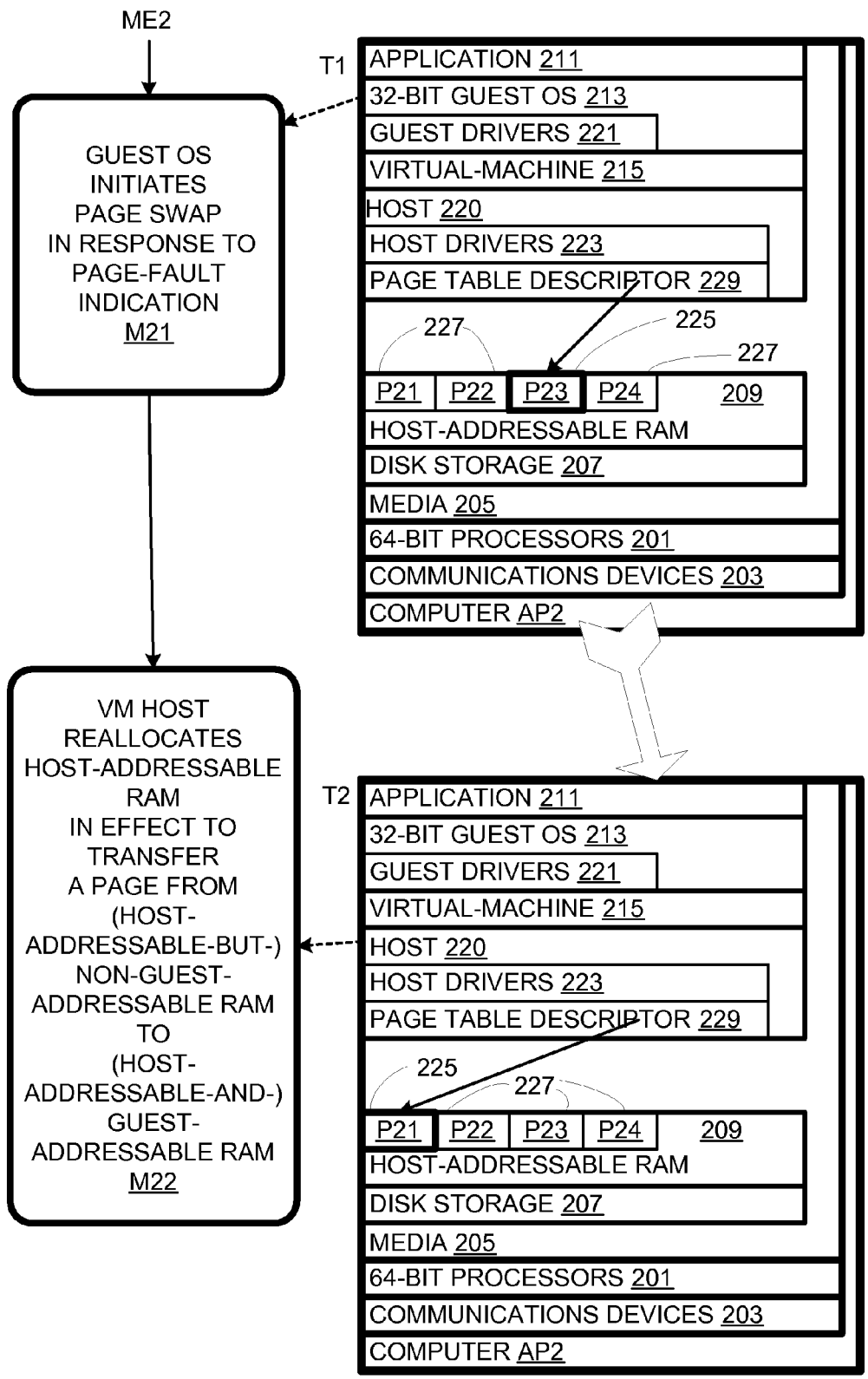
FIG. 2 is a combined flow chart and schematic illustration of a second embodiment of the invention.

Further performance gains are available using a method ME2, flow charted in FIG. 2. At method segment M21, a guest operating system initiates a page swap in response to a page fault. A method segment M22, a host reallocates host-addressable RAM so that the RAM containing the request page is allocated to guest-addressable RAM and the RAM containing the page to be swapped out is in non-guest addressable RAM. Method segments M21 and M22 correspond closely to method segment M11 and M12 of method ME1 (FIG. 1). The methods differ in how the transfers and swapping are effected. In method ME2, the host reconfigures the guest-addressable memory map so that a different section of host-addressable RAM becomes guest-addressable. This can be accomplished by changing the value of a descriptor (e.g., a shadow page table entry), without requiring actual transfers of data pages. Thus, performance penalties due to page faults are further reduced.

Method ME2 is implemented by a computer AP2, which includes 64-bit processors 201, communications devices 203, and computer-readable storage media 205. Media 205 includes disk storage 207 and host-addressable RAM 209. Media 205 is encoded with programs including an application 211, a 32-bit operating system 213, a virtual machine 215, and a virtual-machine host 220. Guest OS 213 includes guest drivers 221 and host 220 includes host drivers 223.

At any given time, RAM 209 is allocated between guest-addressable RAM 225 addressable by guest OS 213 and non-guest-addressable RAM 227 that is not addressable by guest OS 213. However, the allocation changes in response to page swaps. At time T1, before guest OS 213 requests a page swap, host 220 has a page-table descriptor 229 directed at a section of RAM 209 including page P23 and excluding pages P21, P22, and P24. Thus, page P23 is in guest-addressable RAM 225, while other pages P21, P22, and P24 are in non-guest-addressable RAM 227. When guest OS 213 requests a memory location (e.g., a location representing in page P23) not in guest addressable RAM, it receives a page fault. Guest OS 213 responds to the page fault by initiating a page swap.

In response to the initiated page swap, host 220 redirects descriptor 229 to a section of host-addressable RAM 209 including page P21 and excluding pages P22, P23, and P24 as shown at time T2 in FIG. 2. This has the effect of transferring page P23 out of guest-addressable RAM 225 and page P21 into guest-addressable RAM; however, the time required is only that required to redirect descriptor 229 rather than that required to physically move a page from one location to another.

In some embodiments, the guest OS is Windows XP manufactured by Microsoft Corporation, which cannot address main memory above 4 GB. In the case of windows XP, the address length can be extended from 32-bits to 40-bits. The address length is extended to the smallest of RAM disk size (bound by system memory size) and RAM disk. Some 64-bit Intel processors have 40-bit addressing spaces, which serves as an upper bound for memory on systems using these processors (the actual maximum system memory is lower). Other processors have higher addressable space limits (e.g., 40-48 bits). The hypervisor can be Xen, an open source hypervisor developed by Citrix. The processors can be 64-bit x86 processors manufactured by Intel Corporation. Further performance gains can be achieved using paravirtualized drivers.

Figure 3:
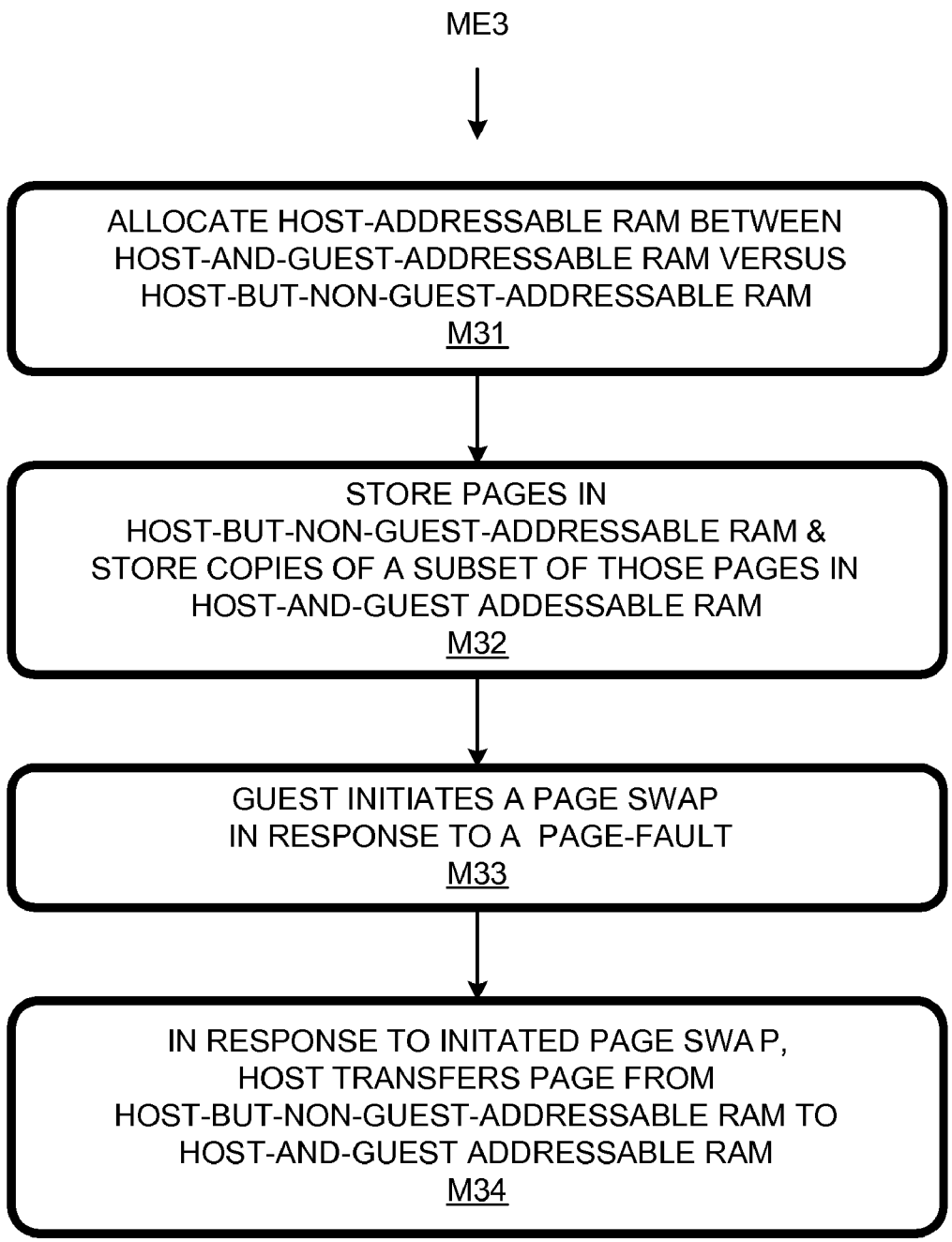
FIG. 3 is a flow chart of a method in accordance with an embodiment of the invention.

A more detailed method ME3 in accordance with an embodiment of the invention is flow charted in FIG. 3. At method segment M31, host-addressable RAM is allocated between host-and-guest-addressable RAM and host-but-non-guest-addressable RAM. At method segment M32, pages are stored in host-but-non-guest-addressable RAM, while copies of some of the pages are stored in host-and-guest addressable RAM. At method segment M33, a guest operating system contained in a virtual machine initiates a disk swap, e.g., in response to a page fault. At method segment M34, a virtual-machine host transfers a first page from host-but-non-guest-addressable RAM into host-and-guest-addressable RAM so that the first page becomes the current page.

Herein, a "host" is a program, tangibly encoded in computer-readable media, of instructions that provides for running an operating system in a virtual machine and that serves as an interface for the virtual machine and underling hardware. The host can include a hypervisor that serves as an operating system or a hypervisor along with one or more host operating systems. A hypervisor can be a Type I or "bare-metal" hypervisor, a Type-II hypervisor, i.e., a combination of a host operating system and a highly privileged virtual machine, typically running in parallel with another virtual machine containing a user operating system, or a hybrid type hypervisor.

Herein, "RAM" refers to "random-access-memory" that can be either dynamic and volatile or static and non-volatile solid-state memory. Herein, RAM is used as addressable system memory by a virtual-machine host. The host system memory can be allocated between host-and-guest-addressable RAM and host-but-non-guest-addressable RAM. A RAM disk is solid-state random-access memory that appears to an operating system as though it were not randomly accessible (in other words, a RAM disk is neither randomly-accessible or a disk). Typically, a RAM disk functions as a very fast storage disk.

Herein, a "page fault" is any indication that a guest OS is requesting data from a location not represented in a page in the guests current system memory. For example, a page fault can occur when an application or user operating system attempts to access a memory location not in the current page in a paged memory system. The response to a page fault typically involves changing the current page to a page containing the memory location to be accessed. In the illustrated embodiments, the current page is changed to a page that was in host-but-non-guest-addressable RAM at the time the indication was generated.

In alternative embodiments, a hypervisor is used with a highly privileged virtual machine helping to manage the virtual machine containing the user guest OS. With a type I or type II hypervisor, the RAM disk can be managed by the hypervisor itself, or by a highly privileged OS. With a type II hypervisor, the highly privileged OS has root system privileges. Different processors, operating systems, and host addressing schemes are provided for. These and other variations upon and modifications to the illustrated embodiments are provided by the present invention, the scope of which is defined by the following claims.

What is claimed is:

1. A method comprising a virtual-machine host responding to a page-swap initiated by a guest operating system by transferring a first page from host-but-non-guest addressable RAM to host-and-guest-addressable RAM.

2. A method as recited in claim 1 wherein said host includes a hypervisor.

3. A method as recited in claim 2 wherein said host further includes one or more host operating systems.

4. A method as recited in claim 1 further comprising storing plural pages in said host-addressable-but-non-guest-addressable RAM and storing one or more pages in said host-and-guest-addressable RAM.

5. A method as recited in claim 1 wherein said host-but-non-guest addressable RAM appears to said host as a RAM disk and to said guest operating system as a disk drive.

6. A method as recited in claim 1 wherein said transferring involves reallocating host-addressable RAM between said host-and-guest-addressable RAM and said host-but-non-guest-addressable RAM so that said host-but-non-guest-addressable RAM includes said first page instead of a second page that was in said host-and-guest-addressable RAM at the time said page-swap was initiated.

7. A method as recited in claim 6 wherein said reallocating involves changing a page-table descriptor so that it refers to a first section of said host-addressable RAM including said first page instead of a second section of said host-addressable RAM including said second page.

8. A method as recited in claim 1 wherein said guest operating system receives a page-fault indication from said host via a virtual machine containing said guest operating system.

9. A computer comprising:
   computer-readable media encoded with data arranged in pages and computer-executable instructions arranged in programs including a virtual-machine host, a virtual machine running on said host, and a guest operating system running on said virtual machine, said media including host-addressable RAM allocated between host-and-guest-addressable RAM addressable by said guest operating system and host-but-non-guest-addressable RAM that is not addressable by said guest operating system; and
   one or more processors for executing said programs so that said host responds to a page-swap initiated by said guest operating system by transferring a first page from said host-but-non-guest RAM to said host-and-guest addressable RAM.

10. A computer as recited in claim 9 wherein said host includes a hypervisor.

11. A computer as recited in claim 9 wherein said host also includes one or more host operating systems.

12. A computer as recited in claim 9 wherein said processors execute said host so as to reallocate said host-addressable RAM between said host-and-guest-addressable RAM and said host-but-non-guest addressable RAM so that said host-but-non-guest addressable RAM includes said first page.

13. A computer as recited in claim 12 wherein said processors execute said host so as to change a page table descriptor so as to reallocate said host-addressable RAM between said host-and-guest-addressable RAM and said host-but-non-guest addressable RAM.

14. A system comprising computer-readable storage media encoded with a virtual-machine host that, when executing, responds to initiation of a page swap by a guest operating system by transferring a first page from a host-but-non-guest-addressable RAM to a host-and-guest-addressable RAM.

15. A system as recited in claim 14 wherein said host, when executing, moves said first page from said host-but-non-guest RAM to said host-and-guest addressable RAM so that said first page becomes a current page in response to said page-fault indication.

16. A system as recited in claim 14 wherein said host, when executing, reallocates said host-addressable RAM between said host-but-non-guest RAM and said host-and-guest addressable RAM so that said host-but-non-guest RAM includes said first page instead of a second page that was in said host-but-non-guest RAM at the time said page-fault indication was generated.

17. A system as recited in claim 14 wherein said host, when executing, changes a page table descriptor so as to reallocate said host-addressable RAM between said host-and-guest-addressable RAM and said host-but-non-guest addressable RAM.

18. A system as recited in claim 14 further comprising one or more processors for executing said host and said guest operating system.

* * * * *